United States Patent
Mohindra

(10) Patent No.: US 12,449,476 B2
(45) Date of Patent: Oct. 21, 2025

(54) PERIODIC JITTER DETERMINATION FOR A PHASE NOISE MEASUREMENT

(71) Applicant: Keysight Technologies, Inc., Santa Rosa, CA (US)

(72) Inventor: Rishi Mohindra, Milpitas, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 478 days.

(21) Appl. No.: 17/956,056

(22) Filed: Sep. 29, 2022

(65) Prior Publication Data

US 2024/0110963 A1 Apr. 4, 2024

(51) Int. Cl.
 *G01R 31/317* (2006.01)
 *G01R 23/16* (2006.01)
 *G01R 29/26* (2006.01)
 *H04L 1/20* (2006.01)

(52) U.S. Cl.
 CPC ....... *G01R 31/31709* (2013.01); *G01R 29/26* (2013.01); *H04L 1/205* (2013.01); *G01R 23/16* (2013.01)

(58) Field of Classification Search
 CPC .. G01R 31/31709; G01R 29/26; G01R 23/16; H04L 1/205
 See application file for complete search history.

(56) References Cited

U.S. PATENT DOCUMENTS

| | | | | |
|---|---|---|---|---|
| 6,525,523 B1 * | 2/2003 | Soma | .................... | G01R 29/26 324/76.77 |
| 6,922,439 B2 | 7/2005 | Yamaguchi et al. | | |
| 7,388,937 B1 * | 6/2008 | Rodger | ................... | H04L 1/205 375/348 |
| 7,463,676 B2 | 12/2008 | Chen | | |
| 8,891,602 B1 * | 11/2014 | Giust | ................... | H04B 17/345 375/226 |

(Continued)

OTHER PUBLICATIONS

Takahiro J. Yamaguchi et al., "Extraction of Instantaneous and RMS Sinusoidal Jitter Using an Analytic Signal Method", IEEE Transactions on Circuits and Systems—II: Analog and Digital Signal Processing, vol. 50, No. 6, Jun. 2003, pp. 288-298.

(Continued)

*Primary Examiner* — John C Kuan

(57) ABSTRACT

A signal analysis system is disclosed. The signal analysis system to: transforms a digitized radio frequency signal into a first transformed digital signal; digitally downconverts the digitized radio frequency signal to a first baseband signal; filter the first baseband signal into a first filtered signal; transforms the first filtered signal into a second transformed digital signal; computes a first phase noise spectrum from the second transformed digital signal, detects spurs and frequencies corresponding to the spurs in the first phase noise spectrum, and set frequency bins not including spurs to zero to generate a modified second transformed digital signal; inversely transforms the modified second transformed digital signal into a first complex time-domain baseband signal; demodulates a first phase signal in the first complex time-domain baseband signal to obtain a first demodulated signal; and obtains an average of slopes and frequency error from the slopes of the first demodulated signal.

20 Claims, 14 Drawing Sheets

(56) References Cited

U.S. PATENT DOCUMENTS

| | | | |
|---|---|---|---|
| 2011/0292987 A1* | 12/2011 | Zivny | G01R 31/31709 |
| | | | 375/226 |
| 2014/0354475 A1* | 12/2014 | Subburaj | G01S 19/21 |
| | | | 342/357.59 |
| 2020/0195258 A1* | 6/2020 | Avivi | H03L 7/093 |
| 2021/0223300 A1* | 7/2021 | Huard | G10H 1/04 |
| 2022/0103401 A1* | 3/2022 | Sood | H04L 25/497 |

OTHER PUBLICATIONS

Leopoldo Angrisani et al., "A Digital Signal Processing Instrument for Real-Time Phase Noise Measurement", IEEE Transactions on Instrumentation and Measurement, Year: 2008, vol. 57, Issue: 10, pp. 1-10.

Warren F. Walls et al., "Cross-Correlation Phase Noise Measurements", 1992 IEEE Frequency Control Symposium, pp. 257-261.

* cited by examiner

PERIODIC JITTER DETERMINATION FOR A PHASE NOISE MEASUREMENT

BACKGROUND

Phase noise test instruments and software are sometimes not able to determine peak phase jitter due to the spurs that are detected in a phase noise measurement, such as when amplitude of these spurs is measured and phase of these spurs is not measured. A root mean square (RMS) value of all the spurs may be incorrectly taken to compute the RMS phase jitter due to the spurs, and the result reflects what is known as periodic jitter or PJ. As an example, if the spurious phase modulation in a clock is a square wave modulation, then the spurious phase modulation has odd harmonic spurs with alternate spurs having 180 degree phases while the remaining spurs have 0 degree phases. The RMS of these spurs will be 43% higher than that of the actual amplitude of the square wave modulation waveform which is the true peak jitter. Therefore, taking RMS of the spurs is incorrect and the actual time domain modulation waveform due to the spurs must be computed to estimate the peak.

Some instruments such as some oscilloscopes and some signal source analyzers (SSAs) may perform a model-fit in time domain to separate out the random jitter from the periodic jitter. However, this method is inaccurate as the results are an approximation using a Dual-Dirac model fit based on noise statistics in time domain, and not an actual measurement of the individual spurs that constitute the periodic jitter. Some instruments also only have 18 to 25 decibel (dB) amplitude modulation (AM) rejection, and this may be insufficient for devices under test (DUTs) that have significant AM spurs that could overshadow the phase modulation (PM) spurs leading to large errors in the peak-peak periodic jitter estimation.

SUMMARY

According to an aspect of the present disclosure, a signal analysis system includes a memory that stores instructions; and a processor that executes the instructions. When executed by the processor, the instructions cause the signal analysis system to: transform a digitized radio frequency signal into a first transformed digital signal; digitally downconvert the digitized radio frequency signal to a first baseband signal; filter the first baseband signal into a first filtered signal; transform the first filtered signal into a second transformed digital signal; compute a first phase noise spectrum from the second transformed digital signal, detect spurs and frequencies corresponding to the spurs in the first phase noise spectrum, and set frequency bins which do not include spurs to zero to generate a modified second transformed digital signal; inversely transform the modified second transformed digital signal into a first complex time-domain baseband signal; demodulate a first phase signal in the first complex time-domain baseband signal to obtain a first demodulated signal; and obtain an average of slopes of the first demodulated signal, and obtain an average frequency error from the average of slopes of the first demodulated signal.

According to another aspect of the present disclosure, a method for signal analysis includes transforming, by a processor that executes instructions from a memory, a digitized radio frequency signal into a first transformed digital signal; digitally downconverting the digitized radio frequency signal to a first baseband signal; filtering the first baseband signal into a first filtered signal; transforming the first filtered signal into a second transformed digital signal; computing a first phase noise spectrum from the second transformed digital signal, detecting spurs and frequencies corresponding to the spurs in the first phase noise spectrum, and setting frequency bins which do not include spurs to zero to generate a modified second transformed digital signal; inversely transforming the modified second transformed digital signal into a first complex time-domain baseband signal; demodulating a first phase signal in the first complex time-domain baseband signal to obtain a first demodulated signal; and obtaining an average of slopes of the first demodulated signal, and obtain an average frequency error from the average of slopes of the first demodulated signal.

According to another aspect of the present disclosure, a controller for signal analysis includes a memory that stores instructions; and a processor that executes the instructions. When executed by the processor, the instructions cause a signal analysis system to: transform a digitized radio frequency signal into a first transformed digital signal; digitally downconvert the digitized radio frequency signal to a first baseband signal; filter the first baseband signal into a first filtered signal; transform the first filtered signal into a second transformed digital signal; compute a first phase noise spectrum from the second transformed digital signal, detect spurs and frequencies corresponding to the spurs in the first phase noise spectrum, and set frequency bins which do not include spurs to zero to generate a modified second transformed digital signal; inversely transform the modified second transformed digital signal into a first complex time-domain baseband signal; demodulate a first phase signal in the first complex time-domain baseband signal to obtain a first demodulated signal; and obtain an average of slopes of the first demodulated signal, and obtain an average frequency error from the average of slopes of the first demodulated signal.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
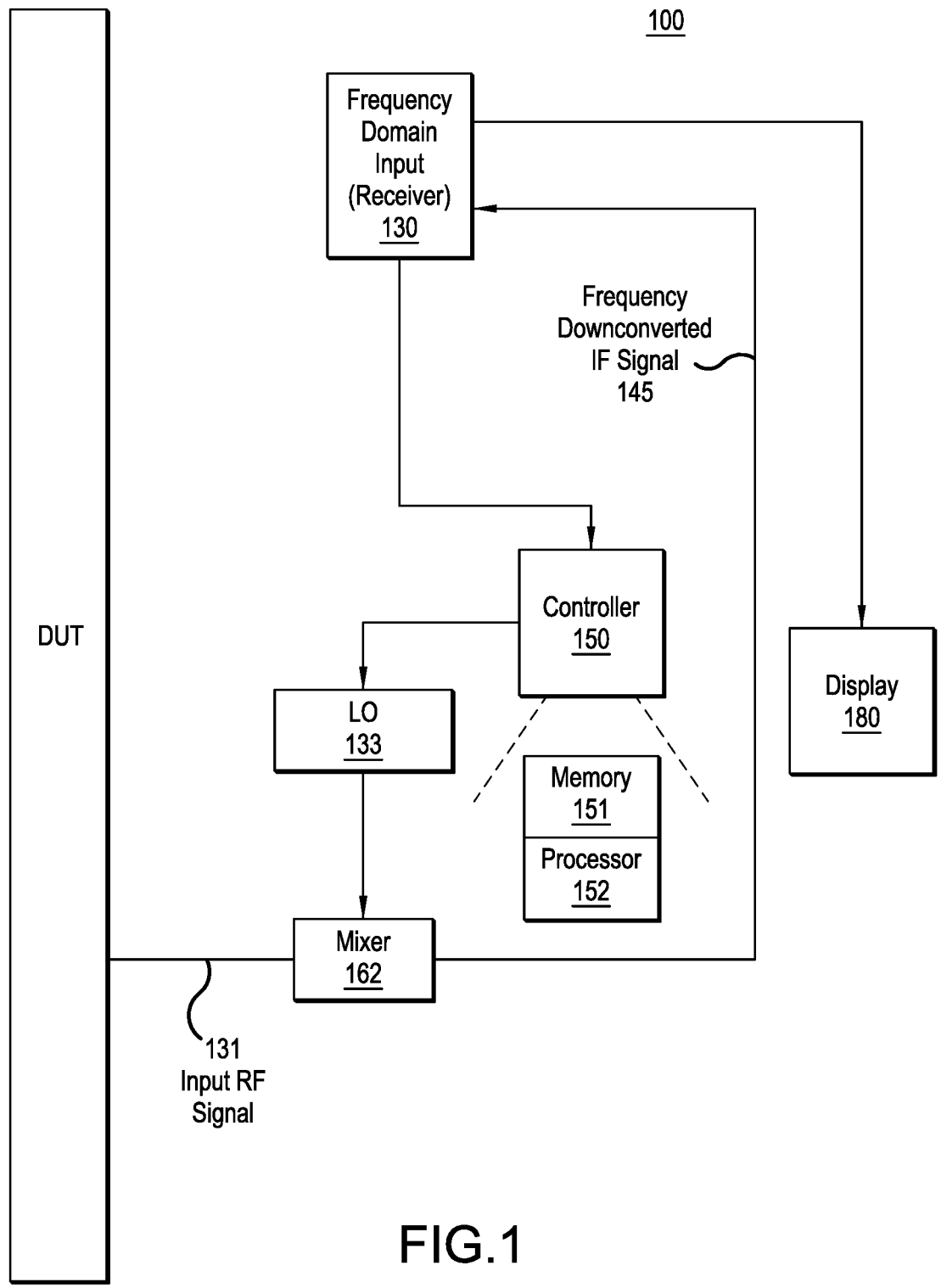
FIG. 1 illustrates a system for periodic jitter determination for a phase noise measurement, in accordance with a representative embodiment.

In the following detailed description, for the purposes of explanation and not limitation, representative embodiments disclosing specific details are set forth in order to provide a thorough understanding of embodiments according to the present teachings. However, other embodiments consistent with the present disclosure that depart from specific details disclosed herein remain within the scope of the appended claims. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. Definitions and explanations for terms herein are in addition to the technical and scientific meanings of the terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below.

As described herein, peak phase jitter due to spurs that are detected in a phase noise measurement may be determined. Accurate determination of low levels of peak periodic jitter may be used to enhance compliance with standards in the presence of potentially much-larger random jitter. An inverse Fourier transform such as an inverse fast Fourier transform (IFFT) may be performed on spur tones frequency data to obtain time information for peak value(s) in the time domain to obtain correct results that are otherwise not reliable when taking the root mean square value in frequency domain. The frequency error may be corrected such that the resulting waveform shows the peak periodic jitter. The low frequency phase noise may also be removed from the periodic jitter waveform using a moving average filter. Periodic jitter determination for a phase noise measurement may be implemented by, for example, an oscilloscope or a spectrum analyzer.

FIG. 1 illustrates a system 100 for periodic jitter determination for a phase noise measurement, in accordance with a representative embodiment.

The system 100 in FIG. 1 is a signal analysis system and includes a receiver 130, a local oscillator 133 (LO), a controller 150, a mixer 162 and a display 180. The controller 150 includes a memory 151 that stores instructions and a processor 152 that executes the instructions. A system 100 may include more or fewer elements than depicted in FIG. 1. The system 100 receives and processes an input RF signal 131 (radio frequency signal) from a DUT (device under test). The input RF signal 131 is received in an analog form in the radio frequency bandwidth from the DUT and then digitized and processed by the system 100. The input RF signal 131 may be, for example, a 25 GHz phase modulated signal from a signal generator, and may be digitized by a real-time oscilloscope at, for example, 128 Gs/s (Fs) for a 64 Msample record length corresponding to 0.5 ms (T) of time-data.

The local oscillator 133 is controlled by the controller 150 to downconvert the input RF signal 131 via the mixer 162. The frequency downconverted IF signal 145 (intermediate frequency signal) is output from the mixer 162. The input RF signal 131 is received in the analog form and mixed with an analog signal from the local oscillator 133 at the mixer 162 to downconvert the input RF signal 131 as received from the DUT. The frequency downconverted IF signal 145 is provided to the receiver 130. The receiver 130 may digitize the frequency downconverted IF signal 145 with an analog-to-digital converter (ADC). The controller 150 receives the digitized radio frequency signal from the receiver 130, and the processor 152 processes the digitized signal based on instructions from the memory 151 to result in visualizations displayed on the display 180.

The controller 150 includes at least the memory 151 that stores instructions and the processor 152 that executes the instructions. The controller 150 may also include interfaces, such as a first interface, a second interface, a third interface, and a fourth interface. One or more of the interfaces may include ports, disk drives, wireless antennas, or other types of receiver circuitry that connect the controller 150 to other electronic elements. One or more of the interfaces may include user interfaces such as buttons, keys, a mouse, a microphone, a speaker, a display separate from the display 180, or other elements that users can use to interact with the controller 150 such as to enter instructions and receive output. The controller 150 may perform some of the operations described herein directly and may implement other operations described herein indirectly. For example, the controller 150 may indirectly control operations such as by generating and transmitting content to be displayed on the display 180. The controller 150 may directly control other operations such as logical operations performed by the processor 152 executing instructions from the memory 151 based on input received from electronic elements and/or users via the interfaces. Accordingly, the processes implemented by the controller 150 when the processor 152 executes instructions from the memory 151 may include steps not directly performed by the controller 150. The controller 150 may perform some of the operations described herein directly and may implement other operations described herein indirectly. For example, the controller 150 may indirectly control operations such as by generating and transmitting content to be displayed on the display 180. The controller 150 may directly control other operations such as logical operations performed by the processor 152 executing instructions from the memory 151 based on input received via the display 180 or another user interface. Accordingly, the processes implemented by the controller 150 when the processor 152 executes instructions from the memory 151 may include steps not directly performed by the controller 150.

The display 180 may be connected to the controller 150 via a local wired interface. The display 180 and/or one or more other element(s) of the system 100 may be interfaced with other user input devices by which users can input instructions, including mouses, keyboards, thumbwheels and so on. The display 180 may also include an interactive touch screen configured to display prompts to users and collect touch input from users.

When executed by the processor 152, the instructions from the memory 151 cause the signal analysis system in FIG. 1 to: transform a digitized radio frequency signal into a first transformed digital signal; digitally downconvert the digitized radio frequency signal to a first baseband signal; filter the first baseband signal into a first filtered signal; transform the first filtered signal into a second transformed digital signal; compute a first phase noise spectrum from the second transformed digital signal, detect spurs and frequencies corresponding to the spurs in the first phase noise spectrum, and set frequency bins which do not include spurs to zero to generate a modified second transformed digital signal; inversely transform the modified second transformed digital signal into a first complex time-domain baseband signal; demodulate a first phase signal in the first complex time-domain signal to obtain a first demodulated signal; and obtain an average of slopes of the first demodulated signal, and obtain an average frequency error from the average of slopes of the first demodulated signal.

In the various representative embodiments described herein, a controller (e.g., controller 150) with a memory (e.g., memory 151) and a processor (e.g., processor 152) are described for periodic jitter determination for a phase noise measurement to carry out the various aspects of the present teachings.

The memory (e.g., memory 151) may include a main memory and/or a static memory, where such memories may communicate with each other and a controller via one or more buses. The memory stores instructions used to implement some or all aspects of methods and processes described herein. The memory may be implemented by any number, type and combination of random access memory (RAM) and read-only memory (ROM), for example, and may store various types of information, such as software algorithms, which serve as instructions, which when executed by a processor cause the processor to perform various steps and methods according to the present teachings. Furthermore, updates to the methods and processes described herein may also be stored in memory.

The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 151 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 151 may store software instructions and/or computer readable code (collectively referred to as 'instructions') that enable performance of various functions of the system 100. The memory 151 may be secure and/or encrypted, or unsecure and/or unencrypted.

"Memory" is an example of computer-readable storage media, and should be interpreted as possibly being multiple memories. The memory for instance may be multiple memories or databases local to the system 100, and/or distributed amongst multiple computer systems or computing devices, or disposed in the 'cloud' according to known components and methods. A computer readable storage medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories.

The controller 150 described below is representative of one or more processing devices, and is configured to execute software instructions stored in memory to perform functions as described in the various embodiments herein. The processor 152 may be implemented by field programmable gate arrays (FPGAs), application specific integrated circuits (ASICs), systems on a chip (SOC), a general purpose computer, a central processing unit, a computer processor, a microprocessor, a graphics processing unit (GPU), a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Modules have software instructions to carry out the various functions using one or multiple processors that may be within the same computing device or which may be distributed across multiple computing devices.

Figure 4A:
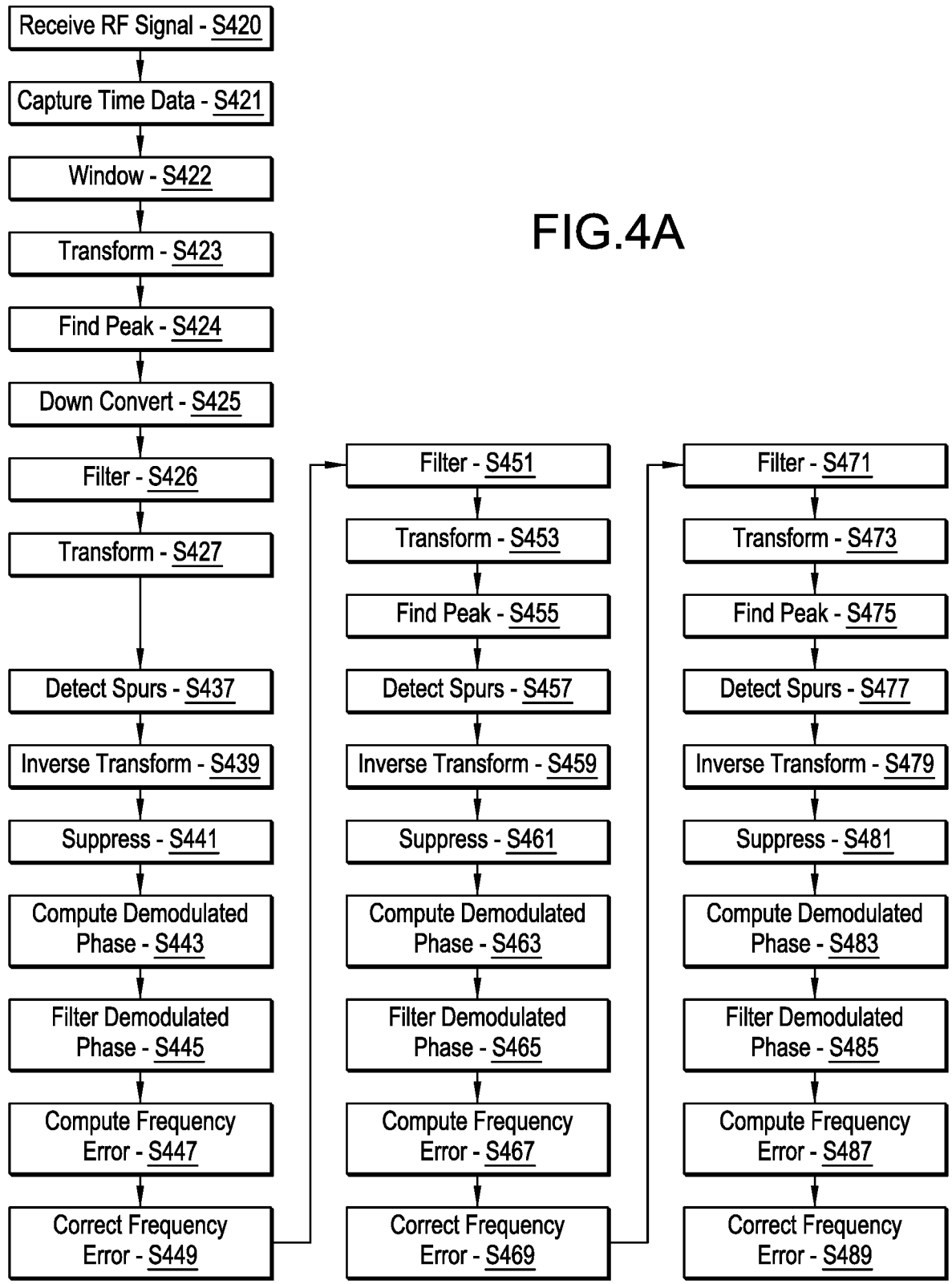
FIG. 4A illustrates a method for periodic jitter determination for a phase noise measurement, in accordance with a representative embodiment.

In one set of embodiments, the system 100 may comprise an oscilloscope that performs a method described with respect to FIG. 4A. In another set of embodiments, the system 100 may comprise a spectrum analyzer that performs a method described with respect to FIG. 4A and FIG. 4B.

Figure 2:
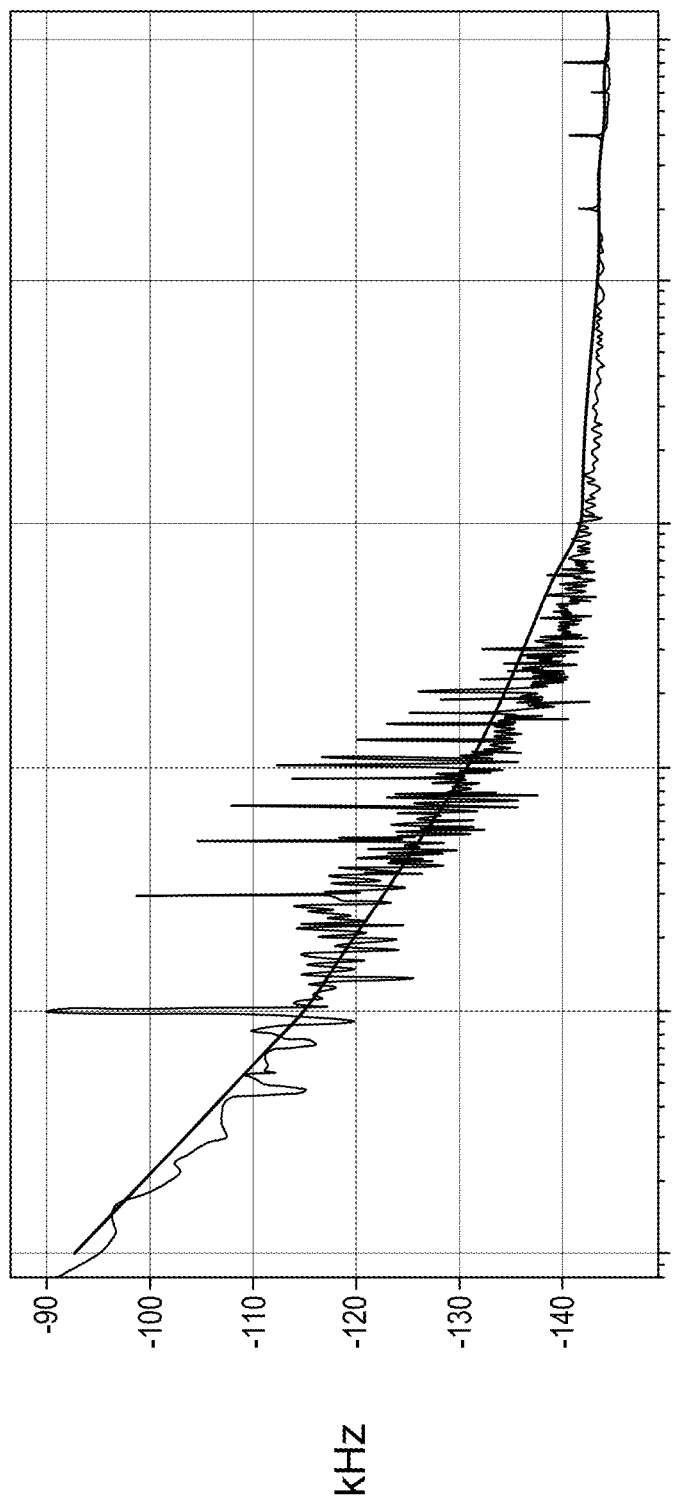
FIG. 2 illustrates peak periodic jitter from time-data capture in periodic jitter determination for a phase noise measurement, in accordance with a representative embodiment.

FIG. 2 illustrates periodic jitter spectral components from time-data capture in periodic jitter determination for a phase noise measurement, in accordance with a representative embodiment.

In FIG. 2, periodic jitter spectral components are shown as the spikes. The periodic jitter spectral components in FIG. 2 is based on time-data capture by an oscilloscope, and spurs producing periodic jitter are identified by the oscilloscope. The periodic jitter in FIG. 2 may be visualized on the display 180 based on the controller 150 executing instructions to implement an algorithm such as the method of FIG. 4A. The horizontal axis is the downconverted baseband frequency and the vertical axis is in dBV/Hz (decibels volts, with measurement normalized to 1 Hz bandwidth).

Figure 3:
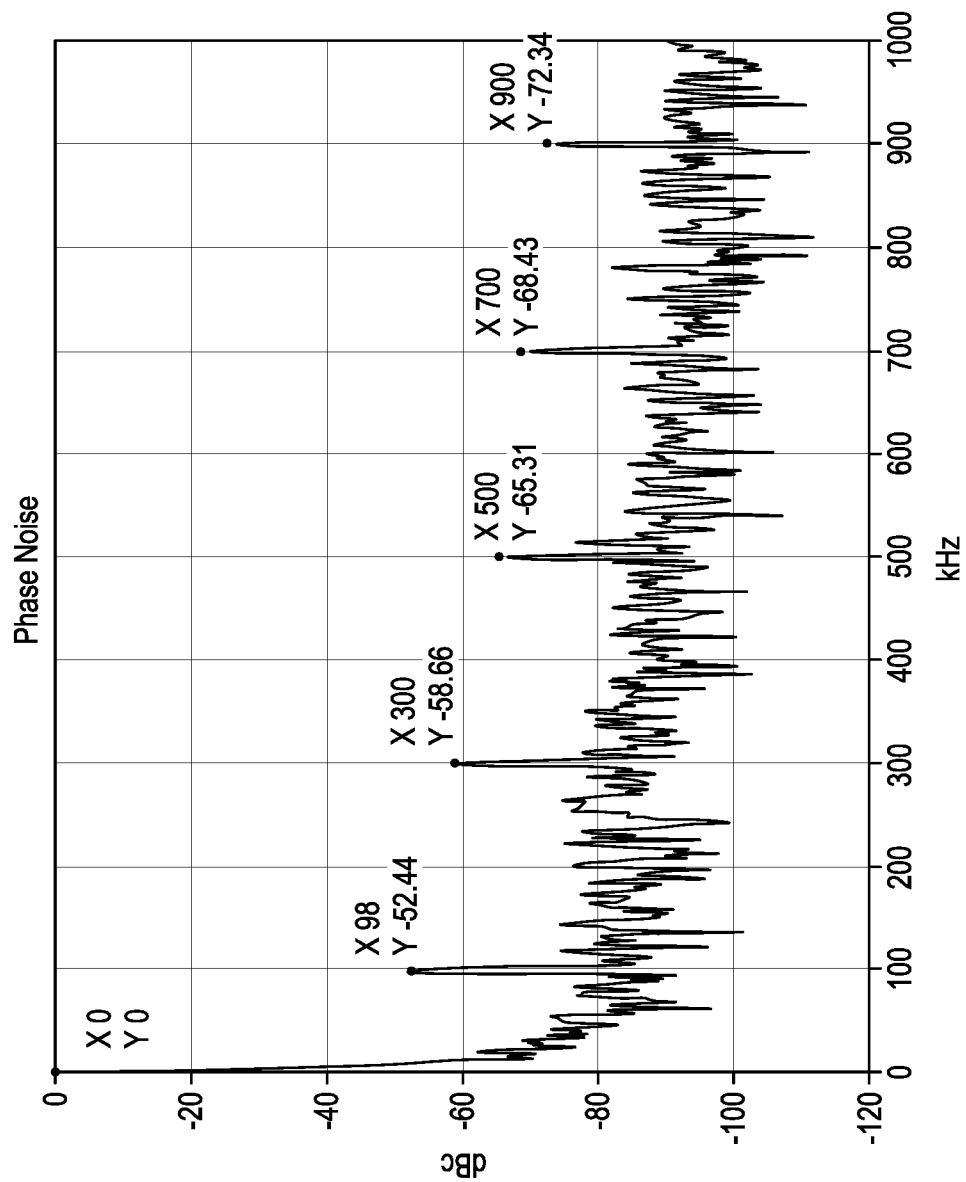
FIG. 3 illustrates phase noise in periodic jitter determination for a phase noise measurement, in accordance with a representative embodiment.

FIG. 3 illustrates phase noise in periodic jitter determination for a phase noise measurement, in accordance with a representative embodiment. The horizontal axis is the frequency offset from the carrier and the vertical axis is in dBc/Hz (decibels relative to the carrier power, with noise measured in 1 Hz bandwidth).

In FIG. 3, phase noise corresponding to the periodic jitter shown in FIG. 2 is shown with labels for the X value (KHz) and the Y value (dBc, decibels relative to the carrier). The phase noise in FIG. 3 may be visualized on the display 180 based on the controller 150 executing instructions to implement an algorithm such as the method of FIG. 4A.

FIG. 4A illustrates a method for periodic jitter determination for a phase noise measurement, in accordance with a representative embodiment.

The method of FIG. 4A may be performed by an oscilloscope. The method of FIG. 4A begins at S420 with receiving a radio frequency signal (RF signal). The radio frequency signal may be received, for example, by the system 100 in FIG. 1 from the DUT in FIG. 1.

At S421, time data is captured for the received radio frequency signal. As an example, a radio frequency signal may be received via a 25 gigahertz (GHz) carrier signal. The received radio frequency signal may be sampled at a rate of 128 Gs/second, resulting in 64 million samples each with a data length of 0.5 milliseconds. The resultant data may be "real" data rather than complex data, and each sample may be specified by 7 bits when output from an analog-to-digital converter (ADC).

At S422, windowing is performed on the time data from S421. The windowing at S422 may be optional and is time-domain windowing when performed.

At S423, a first Fourier transformation is performed. The Fourier transform at S423 is performed either on the digitized time data from S421 without the windowing at S422 or with the windowing at S422. Fourier transforms including the Fourier transform at S423 transform time data into frequency data by transforming a function of time to a function of frequency. At S424, a first peak is found in the transformed data resulting from S423. Additionally, a carrier frequency may be identified in the transformed data at S423. The digitized time data may be transformed to frequency using a fast Fourier transform, so that the peak tone frequency Fcest1 may be detected and the carrier frequency therefore identified.

At S425, the method includes downconverting the time data from S421 based on the carrier frequency identified at S423. The downconverting at S425 may be digital downconverting of the non-windowed "real" data from S421 based on the carrier frequency identified at S423, and may result in a complex baseband. The digital downconverting may use a digital local oscillator.

At S426, a first filter is applied. The first filter at S426 may be a low-pass filter that removes high-frequency components of the downconverted complex baseband signal from S425.

At S427, a second Fourier transformation is performed. The second Fourier transformation at S427 may be performed on the downconverted complex baseband signal from S425 after the first filter is applied at S426. To be clear, the second Fourier transformation at S427 is performed on a different set of data than the first Fourier transformation at S423. Whereas the first Fourier transformation at S423 is performed on the time-data from S421, optionally with windowing applied at S422, the second Fourier transformation at S427 is performed on the downconverted complex baseband signal from S425 after the first filter is applied at S426. The second Fourier transformation may be a fast Fourier transformation, and is taken for the down-converted signal post-filtering at S426 to compute the baseband spectrum. The largest tone will be close to 0 Hz or DC after the second Fourier transformation, and corresponds to the carrier.

At S437, spurs are detected in the baseband signal for the non-zero frequencies. A phase noise spectrum may be computed from the frequency spectrum resulting from the second Fourier transformation performed at S427. Spurs of interest in the phase noise spectrum may be detected with their frequencies detected as f1, f2, f3, . . . fn. The spur detection and selection at S437 may be performed using the system 100 in FIG. 1. For example, an N-sigma threshold may be defined where fast Fourier transform bins exceeding an N-time neighborhood noise floor are selected. Powers of consecutive fast Fourier transform bins may be added as P dBm. If power exceeds a threshold power of C-D, then a spur is detected i.e. P>C-D, where C dBm is equal to carrier power (peak fast Fourier transform power of a bin, usually summed over neighboring consecutive bins that are within, for example 20 dB from peak level. Alternatively, a spur may be detected simply as a peak level if the carrier is a predetermined amount over a noise floor, such as 50 dB over a noise floor, where Vp=max(abs(VCbb)), and D dB is a user defined threshold such as 100 dB. As an example, the level of the peak spur may be noted from all tones except for the strongest tone near DC tone corresponding to the carrier.

In some embodiments, spurs may be detected at S437 using an algorithm that selects all fast Fourier transform bins with individual power levels P that satisfy P>C-D. In other embodiments, such as when spurs are expected to be very small and close to a noise floor, a 2-channel cross-correlation technique may be used to lower the noise floor contribution of the system 100, as this helps in identifying the frequency and amplitude of the spurs, but not their phases. In these embodiments, to determine the phases accurately for spurs that are harmonically related at integer multiples of a fundamental offset frequency, phase of the spurs may be computed relative to the fundamental offset frequency: $\Delta\theta i = \theta i - \theta 1$ where $\theta 1$ is the phase of the fundamental offset frequency. $\theta i = \arctan 2(Qi/Ii)$, where Qi and Ii are the real and imaginary components of the ith harmonically related spur, i=1,2,3 etc., with offset frequency fi and amplitude $Ai = \sqrt{(Ii)^2 + (Qi)^2}$, and where fi=Kf1 where K is an integer. In these embodiments, Ai is determined more accurately from cross-correlation phase noise measurement. Additionally, the fast Fourier transform data may be de-rotated by $e^{\wedge}(-j\omega\tau)$ where w is the tone frequency and t is the delay of each capture relative to the first, computed from the phase of the fundamental tone in the FFT relative to that of the first capture. Subsequently, the mean relative phase of each periodic jitter spur over multiple measurement is computed as: $\Delta\theta i_{mean} = \text{mean}(\Delta\theta i) = \text{mean}(\theta i) - \text{mean}(\theta 1)$. Additionally for these embodiments, the inverse fast Fourier transform may be taken in the manner described below for S439 over the set of periodic jitter spurs as $Ai*e^{\wedge}(j\Delta\theta i_{mean})$ with i=1,2,3 etc., and $\Delta\theta 1_{mean}=0$ which is the reference at i=1. $\theta(t)$=the inverse fast Fourier transform $Ai*e^{\wedge}(j\Delta\theta i_{mean})$ and t is discrete time. The peak-peak value of $\theta(t)$ is the required result for the peak-peak periodic jitter.

As one final matter for S437, frequency bins not selected as spurs or part of spurs may be set to zero amplitude. For example, a threshold decibel level of 30 dB below the maximum tone level may be used to select spurs to set to zero. The largest tone near DC or at DC is retained as the carrier as it is required for the phase demodulation up to S443.

At S439, a first inverse Fourier transformation is performed. The first inverse Fourier transformation is performed at S439 to convert the non-zero Fourier transformation data from S437 back to a complex time domain baseband signal. The first inverse fast Fourier transform is applied to spur tone frequency data remaining in the modified second transformed digital signal. For example, the first inverse Fourier transformation may comprise an inverse fast Fourier transformation, and may be taken to convert the frequency-domain carrier and spurious signal to a complex time domain signal baseband signal.

At S441, suppression is performed. S441 is an optional step to suppress amplitude modulation noise (AM noise) by converting the complex time domain baseband signal from S439 to a constant amplitude by dividing each sample by its instantaneous magnitude.

At S443, a first demodulated phase is computed. The first demodulated phase is computed at S443 using a dedicated algorithm. For example, the algorithm atan2(Q/I) algorithm from Matlab may be used for the computation at S443. According to the atan2(Q/I) algorithm, using the complex time-domain signal, the phase may be demodulated using the algorithm phase=arctan 2(Imaginary signal/Real signal). At S445, the first demodulated phase is optionally filtered to remove high frequency noise created by the atan2(Q/I) operation.

At S447, the first frequency error is computed. The first frequency error is computed at S447 from the slope of the first demodulated phase computed at S443. The unwrapped value of the demodulated phase may be taken to avoid discontinuities at positive 180 degrees and negative 180 degrees. The average slope of the phase signal may be computed using methods such as least mean square error straight line fit. The average frequency error may be computed as the slope of the straight line fit.

At S449, the first frequency error is corrected. The first frequency error is corrected at S449 by downconverting the original radio frequency signal based on the average frequency error into a corrected radio frequency signal with a new local oscillator signal that has an updated local oscillator frequency value. In the context of the radio frequency signal received at S420, the correction at S449 may correct the received radio frequency signal based on an average frequency error into a corrected radio frequency error by downconverting the first signal i.e., the original radio frequency signal, using a corrected digital local oscillator into a corrected baseband signal. At S449, the baseband signal is corrected for the frequency error computed at S447.

At or after S449, the phase may be demodulated again in the time domain, and random fluctuations of the phase may be removed using a low frequency phase tracking method such as by using a digital phase locked loop (PLL). In some embodiments, the demodulated phase is filtered using a moving average filter with a memory span twice or even multiple of that of the fundamental period of the periodic jitter so that the net contribution from the periodic jitter is zero in the moving average. The moving average filter is non-causal and centered at the current input sample so that half the memory is from the past samples and the other half from the future samples. The past samples and future samples in total encompass one or more cycles of the periodic jitter fundamental period so that the average phase value is not affected by the periodic jitter spurs. The averaged phase is subtracted from the demodulated phase to produce the waveform of the phase modulation due to the periodic jitter constituent spurs. This waveform is free of low frequency phase jitter at frequencies lower than the fundamental frequency of the periodic jitter.

The frequency correction is divided between two separate processes. The first process is based on the frequency of the peak tone in the interval 0 to Fs/2 after the Fourier transform of a sampled "real" signal, and this frequency of the peak tone is used for the digital down conversion. This is performed at step S425. However, this frequency resolution which is the tone-spacing for a fast Fourier transform, is 1/T where T is the measurement length, and this frequency resolution may be too coarse and may produce a large phase ramp to view a relatively small periodic jitter phase modulation in time domain. The second step or process is for frequency correction as described above, wherein the arctan 2 method may be used to demodulate the phase of the down converted signal, followed by the computation of the average slope of the phase for the frequency error estimation. Alternately, a digital phase locked loop (DPLL) may be used. This is done at steps S449, S469 and S489.

As described, the down-converted signal may be filtered in time domain using a low-pass filter with a cut-off less than half the sampling frequency and slightly larger than the highest spur frequency of interest. The filtering removes the high-frequency unwanted phase noise from affecting the arctan 2 (Imaginary signal/Real signal) algorithm based extracted waveform of the periodic jitter spurs in time-domain. This phase detection algorithm may provide 50 dB of amplitude modulation rejection as tested using raw data captured from an oscilloscope. Additionally, the complex baseband signal may be normalized to its instantaneous envelope to remove the amplitude modulation noise and improve the performance of the phase detection algorithm of arctan 2 (Imaginary signal/Real signal) by 20 dB, thereby achieving approximately net 80 dB of AM rejection.

The method from S426 to S449 may comprise a first iteration of a process that is repeated. At S451, a second filter is applied. The second filter at S451 may be a low-pass filter that removes high-frequency components of the downconverted or frequency corrected complex baseband signal from S449. The filtering at S451 may filter the corrected baseband signal from S449 into a corrected filtered signal. At S453, a third Fourier transformation is performed. The third Fourier transformation at S453 may be performed on the downconverted complex baseband signal from S449 after the second filter is applied at S451. The third Fourier transformation at S453 is analogous to the second Fourier transformation at S427, but is performed for the second iteration whereas the second Fourier transformation is performed for the first iteration. At S455, a second peak is found in the transformed data resulting from S453. At S457, spurs are detected in a manner similar to or identical to S437, and only the spurs are retained. At S459, a second inverse Fourier transformation is performed in a manner similar to or identical to S439 to convert to the complex time domain. The second inverse fast Fourier transform is applied at S459 to spur tone frequency data remaining in a modified third transformed digital signal from the processing after the third Fourier transformation at S453.

At S461, suppression is performed in a manner similar to or identical to S441. At S463, a second demodulated phase is computed in a manner similar to or identical to S443. At S465, the second demodulated phase is filtered in a manner similar to or identical to S445. At S467, the second frequency error is computed in a manner similar to or identical to S447 from the slope of the second demodulated phase. At S469, the second frequency error is corrected in a manner similar to or identical to S449 by downconverting the original signal with a new local oscillator signal updated to a new local oscillator frequency value. In the context of the radio frequency signal received at S420, the correction at S469 may again correct the received radio frequency signal based on an average frequency error into a corrected radio frequency error by downconverting the first transformed signal (i.e., the original signal) using a corrected digital local oscillator into a corrected baseband signal. The correction at S469 may be a secondary improvement, wherein the correction at S449 may be a primary improvement.

The method from S451 to S469 may comprise a second iteration of a process that is repeated.

At S471, a third filter is applied. The third filter at S471 may be a low-pass filter that removes high-frequency components of the downconverted complex baseband signal from S469. The filtering at S471 may filter the corrected baseband signal from S469 into a corrected filtered signal. At S473, a fourth Fourier transformation is performed. The fourth Fourier transformation at S473 may be performed on the downconverted complex baseband signal from S469 after the third filter is applied at S471. The fourth Fourier transformation at S473 is analogous to the second Fourier transformation at S427 and the third Fourier transformation from S453, but is performed for the third iteration whereas the third Fourier transformation is performed for the second iteration and the second Fourier transformation is performed for the first iteration. At S475, a third peak is found in the transformed data resulting from S473. At S477, spurs are detected in a manner similar to or identical to S437 and similar to or identical to S457, and only the spurs are retained. At S479, a third inverse Fourier transformation is performed in a manner similar to or identical to S439 and similar to or identical to S459 to convert to the complex time domain. The third inverse fast Fourier transform is applied at S479 to spur tone frequency data remaining in a modified fourth transformed digital signal from the processing after the fourth Fourier transformation at S473.

At S481, suppression is performed in a manner similar to or identical to S441 and similar to or identical to S461. At S483, a third demodulated phase is computed in a manner similar to or identical to S443 and similar to or identical to S463. At S485, the third demodulated phase is filtered in a manner similar to or identical to S445 and similar to or identical to S465. At S487, the third frequency error is computed in a manner similar to or identical to S447 and similar to or identical to S467 from the slope of the third demodulated phase. At S489, the third frequency error is corrected in a manner similar to or identical to S449 and similar to or identical to S469 by downconverting the original signal with a new local oscillator signal updated to a new local oscillator frequency value. In the context of the radio frequency signal received at S420, the correction at S489 may again correct the received radio frequency signal based on an average frequency error into a corrected radio frequency error by downconverting the first transformed signal (i.e., the original signal) using a corrected digital local oscillator into a corrected baseband signal. The correction at S489 may be a tertiary improvement, wherein the correction at S469 is a secondary improvement, and the correction at S449 may be a primary improvement.

The method from S471 to S489 may comprise a third iteration of a process that is repeated.

Notably, and although not shown in FIG. 4A, another algorithm or sub-algorithm may be performed after S489 for phase tracking for low-frequency phase noise removal. The separate algorithm may be used to remove the low frequency phase noise with a modulation frequency less than the fundamental (lowest) tone of the spurs. The digital signal from S489 may be filtered using a moving average filter. Optionally a digital phase locked loop (PLL) may be used with a bandwidth less than the lowest spur frequency. In the separate algorithm a "real" phase signal such as at a 128 GHz sample rate may be down sampled by factor 64 to 2 GHz, optionally with low pass filtering before down sampling. The down sampling and low-pass filtering may be performed assuming the maximum spur frequency is below 1 GHz in order to speed up processing time. A moving average filter is applied to the modified second transformed digital signal. The spur waveform period is the inverse of the fundamental spur frequency. The moving average filter spans integer multiples of the period of the spur waveform, and ensures that the modulation from spurs is eliminated at the filter output insofar as average over integer multiple of spur periods will be net zero from the modulation waveform. Only the low-frequency noise will appear at the filter output. As a result, the algorithm or sub-algorithm after S489 may average phases from the digital signal after filtering to obtain an averaged phase. The phase signal may be compensated for filter delay. The moving average filter output is subtracted from the phase signal, and the resultant phase modulation waveform due to the spurs is displayed. The phase modulation waveform due to the spurs is a waveform of the second transformed digital signal attributable to periodic constituent spurs by subtracting the averaged phase from the modified second transformed digital signal. Moreover, it is also noted that this low frequency noise removal may be carried out after S449 or S469 as a final step when the carrier frequency error is already very comparatively small i.e., much less than the reciprocal of the total waveform time duration.

Figure 4B:
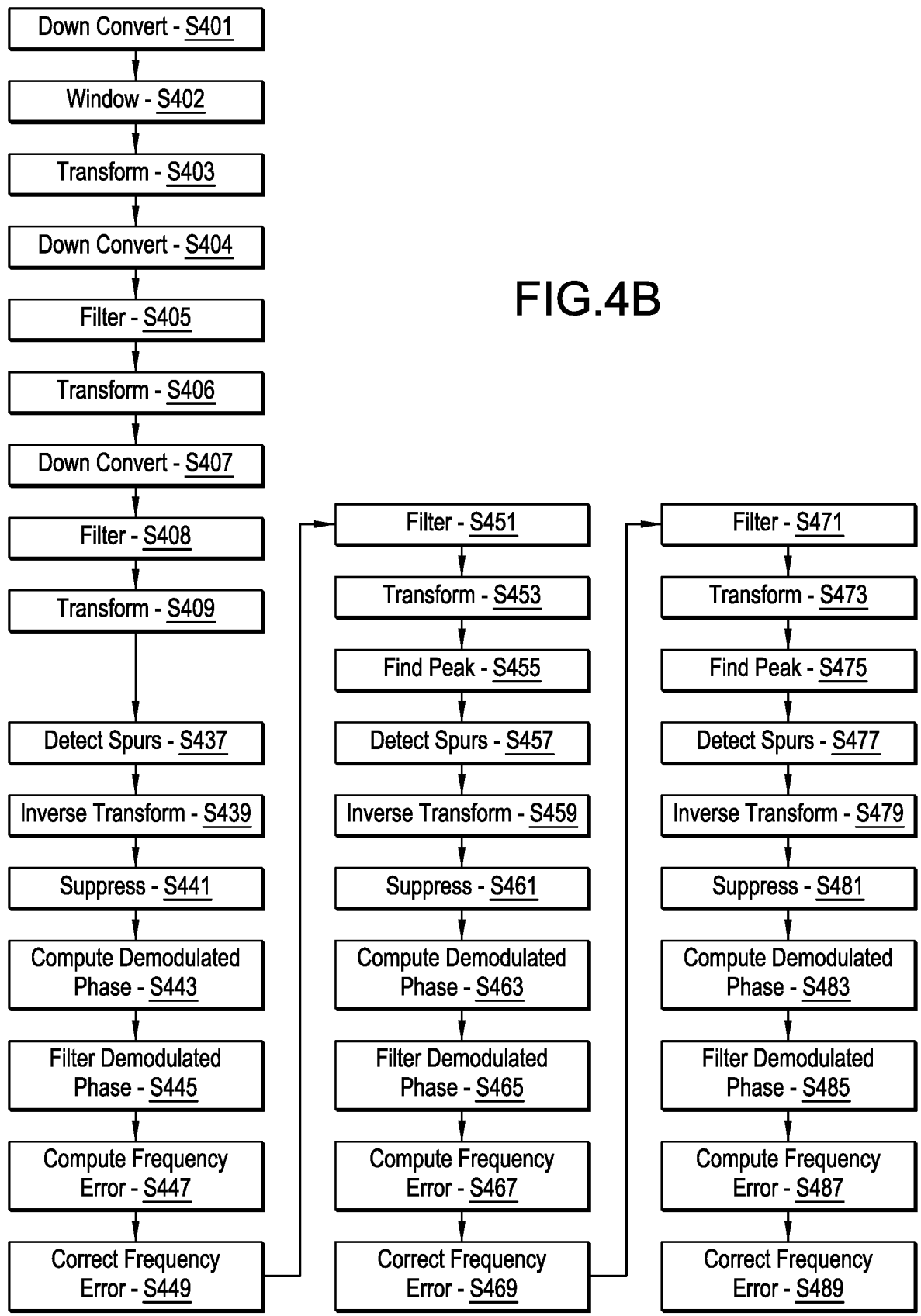
FIG. 4B illustrates another method for periodic jitter determination for a phase noise measurement, in accordance with a representative embodiment.

FIG. 4B is described next. The method of FIG. 4A alone may be performed by an oscilloscope, whereas the combined method of FIG. 4B and FIG. 4A may be performed by a spectrum analyzer. While an oscilloscope samples the carrier signal directly, a spectrum analyzer may sample an intermediate frequency signal which is a down converted version of the carrier signal. The signal processing steps are similar for both methods for the extraction of the periodic jitter spurs to time-domain waveform.

FIG. 4B illustrates another method for periodic jitter determination for a phase noise measurement, in accordance with a representative embodiment.

The method of FIG. 4B may be performed by a signal analyzer such as a spectrum analyzer which is used to characterize signals. The method of FIG. 4B begins at S401 with downconverting a received radio frequency signal as an analog signal. The downconverted radio frequency signal may be downconverted by the system 100 in FIG. 1. The radio frequency signal may be received via a 25 gigahertz (GHz) carrier signal, and downconverted to an intermediate signal at an intermediate frequency (IF) under 10 GHz. The radio frequency signal is downconverted to the center of the intermediate frequency bandwidth as an analog signal, and then digitized into a digitized radio frequency signal that is next digitally downconverted to an intermediate digital signal at an intermediate frequency. The sampling rate for the analog-to-digital converter may be more than twice the maximum intermediate frequency. The intermediate digital signal is a complex baseband signal and the digital downconversion to the intermediate digital signal uses a complex digital local oscillator that is at the center frequency of the intermediate frequency bandwidth.

At S402, windowing is performed on the time data from S401. The windowing at S402 may be optional and is time-domain windowing when performed.

At S403, a first Fourier transformation is performed. The intermediate digital signal from S401 is transformed into a transformed intermediate digital signal at S403. The Fourier transform at S403 is performed either on the digitized time data from S401 without the windowing at S402 or with the windowing at S402. At S403, a first peak is found in the transformed intermediate digital signal resulting from the transformation at S403. Additionally, a carrier frequency may be identified in the transformed intermediate digital signal at S403 based on the first peak.

At S404, the method includes digitally downconverting the intermediate signal from S401 based on the carrier frequency identified at S403. The downconverting at S404 may be digital downconverting of the non-windowed "real" data from S401 based on the carrier frequency identified at S403, and may result in a complex baseband signal. The digital downconverting may use a digital local oscillator.

At S405, a first filter is applied to filter the complex baseband signal from S404 to remove high frequency components. The first filter at S405 may be a low-pass filter that removes high-frequency components of the downconverted complex baseband signal from S404. S403, S404 and S405 may be steps which are not particularly analogous to corresponding steps in the method of FIG. 4A.

Notably, S401 is analog downconversion to an IF analog signal, which is next digitized. S404 is digital downconversion from "real" IF to "complex" baseband and may be done in the existing analyzers. Once the signal is available as complex baseband signal, frequency correction alone is done using a digital LO, which has a comparatively very small frequency and is equal to the frequency error. In the oscilloscope the signal is directly available as a digitized RF Carrier that is directly downconverted to "complex" baseband using a frequency corrected LO. Once available as complex baseband, the Oscilloscope and Analyzer can follow identical steps thereon. It is not required to always downconvert from digital RF to complex baseband for oscilloscope whenever frequency correction is done. The subsequent correction can be done on the baseband signal that is available after the $1^{st}$ correction. The $2^{nd}$ and $3^{rd}$ correction don't use the frequency error value of the $1^{st}$ correction as this correction has already been performed.

At S406, a second Fourier transformation is performed. The second Fourier transformation at S406 may be performed to transform the complex baseband signal from S404 after the first filter is applied at S405 to result in the first transformed digital signal. In other words, the filtered complex baseband signal from S405 in FIG. 4B may be analogous to the first transformed digital signal from S423 in FIG. 4A. To be clear, the second Fourier transformation at S406 is performed on a different set of data than the first Fourier transformation at S403. Whereas the first Fourier transformation at S403 is performed on the time-data from S401, optionally with windowing applied at S402, the second Fourier transformation at S406 is performed on the downconverted complex baseband signal from S404 after the first filter is applied at S405. At S406, a second peak is found in the transformed data. Additionally, a carrier frequency may be identified in the transformed data at S406 based on the first peak.

At S407, downconversion is again performed. The downconverting at S407 is a digital downconversion of the non-windowed signal from S401 to a complex baseband based on the carrier frequency identified at S403 based on the second peak.

At S408, second filtering is performed. The second filtering at S408 may be applied using a low-pass filter that removes high-frequency components of the downconverted complex baseband signal from S407.

At S409, a third Fourier transformation is performed on the filtered downconverted complex baseband signal from S408. Afterwards, the process from S437 in FIG. 4A is performed including the iterated steps. That is, at S437, spurs are detected; at S439, a first inverse Fourier transformation is performed; at S441, suppression is performed; at S443, a first demodulated phase is computed; at S445, the first demodulated phase is filtered; at S447, the first frequency error is computed; at S449, the first frequency error is corrected in the first iteration. At S451, third filtering is applied; at S453, a fourth Fourier transformation is performed; at S455, a second peak is found. S455 may measure peak periodic phase jitter by measuring a peak of time domain combined phase of all spurs selected in a frequency domain for the corrected baseband signal, and after removing the frequency errors at S449.

At S457, spurs are detected; at S459, a second inverse Fourier transformation is performed; at S461, suppression is performed; at S463, a second demodulated phase is computed; at S465, the second demodulated phase is filtered; at S467, the second frequency error is computed; and at S469, the second frequency error is corrected in the second iteration; at S471, fourth filtering is performed; at S473, a fifth Fourier transformation is performed; at S475, a third peak is found. S475 may measure peak periodic phase jitter by measuring a peak of time domain combined phase of all spurs selected in a frequency domain for the corrected baseband signal, and after removing the frequency errors the second time at S469.

At S477, spurs are detected; at S479, a third inverse Fourier transformation is performed; at S481, suppression is performed; and at S483, a third demodulated phase is computed; at S485, the third demodulated phase is filtered; at S487, the third frequency error is computed; and at S489, the third frequency error is corrected in a third iteration.

Spectrum analyzers may implement the method of FIG. 4B by downconverting radio frequency signals to a real intermediate frequency signal and then digitize the intermediate frequency signal before digitally downconverting the digitized intermediate frequency signal to complex baseband using a local oscillator that is at the center of the intermediate frequency band. From thereon, the processing in FIG. 4B is similar to that performed on the baseband signal using the oscilloscope method of FIG. 4A.

The method of FIG. 4A alone or the methods of FIG. 4A and FIG. 4B in combination may be implemented in real-time to accurately compute the peak value of the periodic jitter due to all detected and selected phase noise spurs while suppressing amplitude modulation (AM) spurs. Amplitude modulation spurs may be suppressed by 80 dB. The methods of FIG. 4A alone or FIG. 4A and FIG. 4B in combination may involve computing the time domain waveform due to the phase noise related spurs, and this computation provides valuable information to users regarding the peak value as well as the actual wave shape.

As another matter to consider in the context of the teachings herein, spectral leakage may warrant mitigation. The baseband frequencies of the periodic jitter spur components are sometimes not exact multiples of the fast Fourier transform tone spacing of 1/T, and due to this some power may be spilled into adjacent tones of the main spur tone, causing spectral leakage. When taking the inverse fast Fourier transform of the spur tones, these adjacent tones may have been be de-selected if their power didn't exceed the threshold requirement for spur detection. To mitigate this, the demodulated time-domain phase may be taken only in the central region after the inverse fast Fourier transform, discarding the beginning and ending regions of the time-domain signal. Also or alternatively, additional tones may be taken around the main spur tones, for the inverse fast Fourier transform. This captures the tones with the leakage power.

Figure 5:
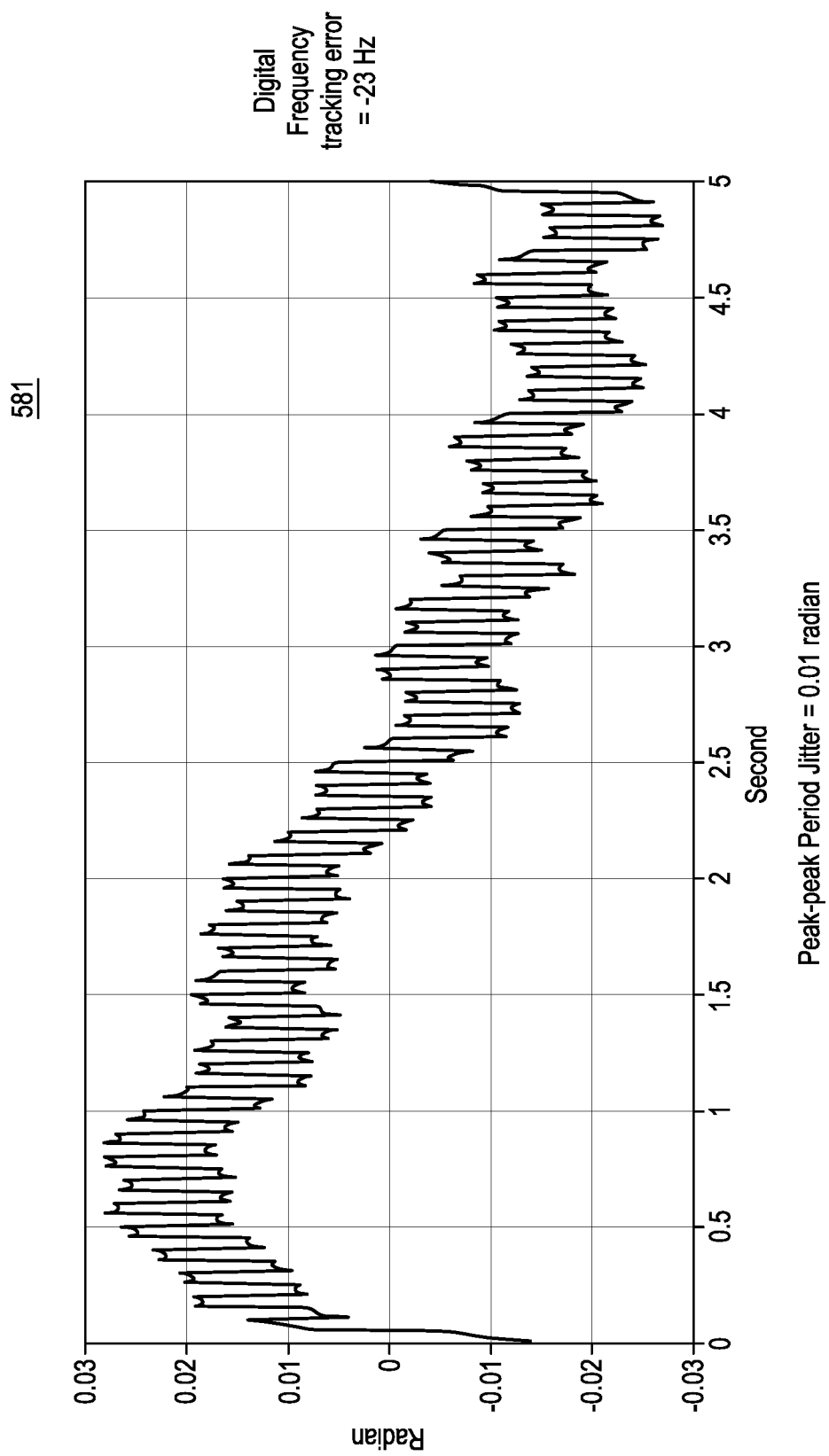
FIG. 5 illustrates demodulated time domain periodic jitter in periodic jitter determination for a phase noise measurement, in accordance with a representative embodiment.

FIG. 5 is a graph 581 that illustrates demodulated time domain periodic jitter in periodic jitter determination for a phase noise measurement, in accordance with a representative embodiment.

FIG. 5 illustrates demodulated phase due to periodic jitter so that peak-peak periodic jitter may be measured. In FIG. 5, the peak-peak periodic jitter equals 0.1 radians, and the tracking error equals −23 Hz.

Figure 6:
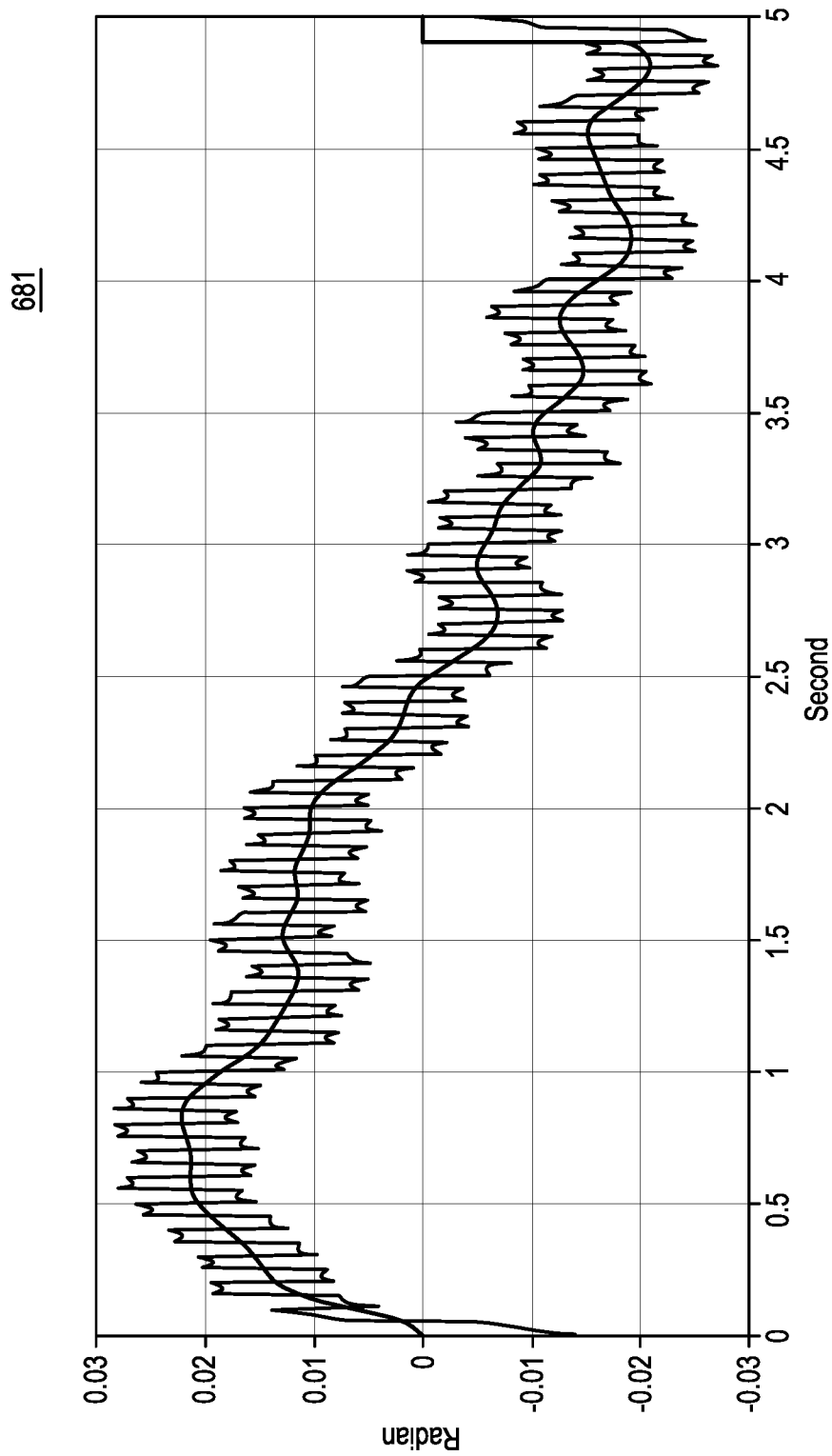
FIG. 6 illustrates low frequency phase drift tracking in periodic jitter determination for a phase noise measurement, in accordance with a representative embodiment.

FIG. 6 illustrates low frequency phase drift tracking in periodic jitter determination for a phase noise measurement, in accordance with a representative embodiment.

FIG. 6 is a graph 681 that illustrates low-frequency phase drift at output of the moving average filter superimposed on the demodulated phase due to periodic jitter in FIG. 5.

Figure 7:
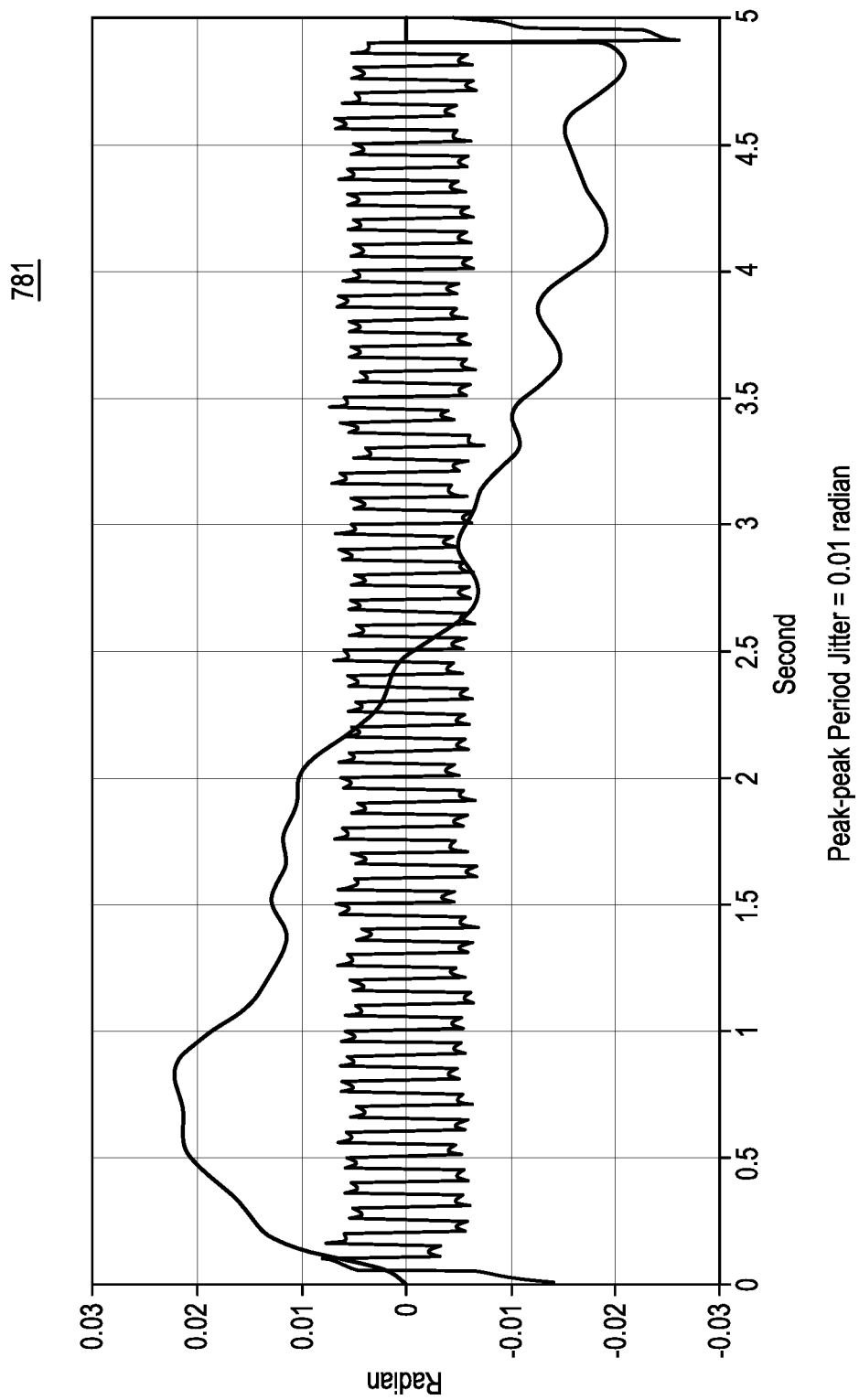
FIG. 7 illustrates low frequency phase drift subtraction in periodic jitter determination for a phase noise measurement, in accordance with a representative embodiment.

FIG. 7 illustrates low frequency phase drift subtraction in periodic jitter determination for a phase noise measurement, in accordance with a representative embodiment.

FIG. 7 is a graph 781 that illustrates the effect of subtracting the low-frequency phase drift tracked in FIG. 6 from the demodulated phase due to periodic jitter in FIG. 5. As shown, the demodulated phase due to periodic jitter is not exactly uniformly horizontal at the top and bottom of each wave, but is much closer to uniformly horizontal at the top and bottom of each wave compared to the demodulated phased in FIG. 5. The flattening is due to subtraction of the low-frequency phase drift as tracked in FIG. 6.

Figure 8:
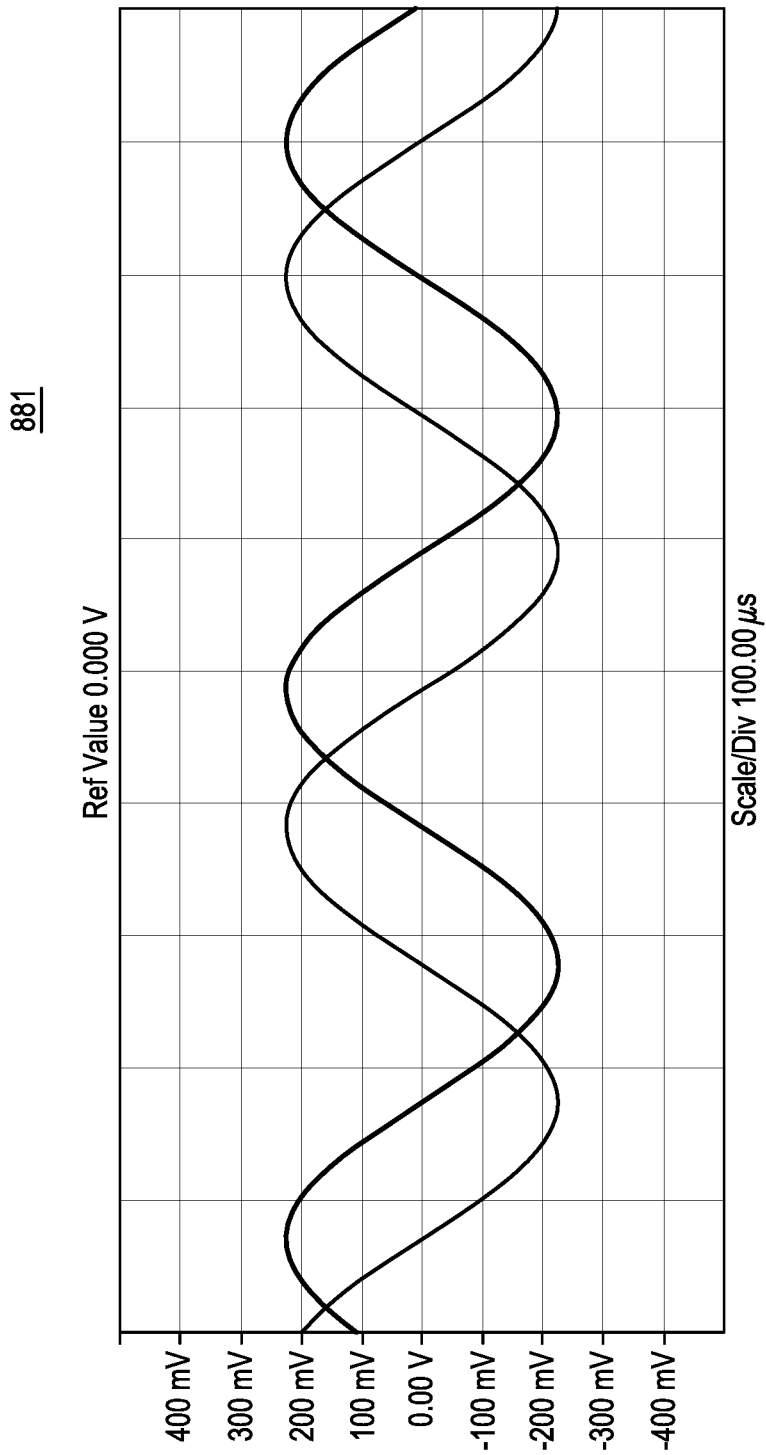
FIG. 8 illustrates data capture with a digital intermediate frequency in periodic jitter determination for a phase noise measurement, in accordance with a representative embodiment.

FIG. 8 is a graph 881 that illustrates complex baseband signal with some frequency error in periodic jitter determination for a phase noise measurement, in accordance with a representative embodiment.

In FIG. 8, complex IQ baseband data is produced due to complex downconversion of real digital intermediate frequency signal with digital bandwidth of 800 MHz at a complex sampling rate of 1Gs/s. Notably, each real and imaginary LO signal is sampled illustratively at 1Gs/s.

Figure 9:
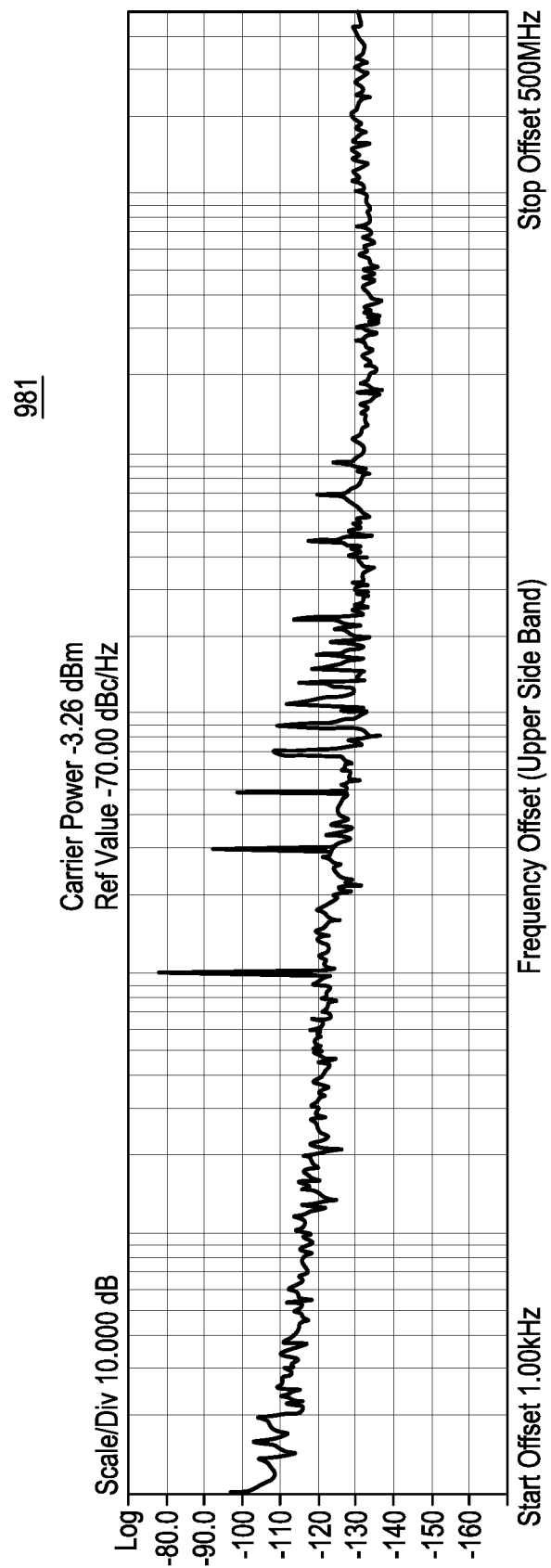
FIG. 9. illustrates a phase noise measurement in periodic jitter determination for a phase noise measurement, in accordance with a representative embodiment.

FIG. 9 is a graph 981 that illustrates a phase noise measurement in periodic jitter determination for a phase noise measurement, in accordance with a representative embodiment.

In FIG. 9, the phase noise of the complex IQ baseband data in FIG. 8 is captured with phase modulation.

Figure 10:
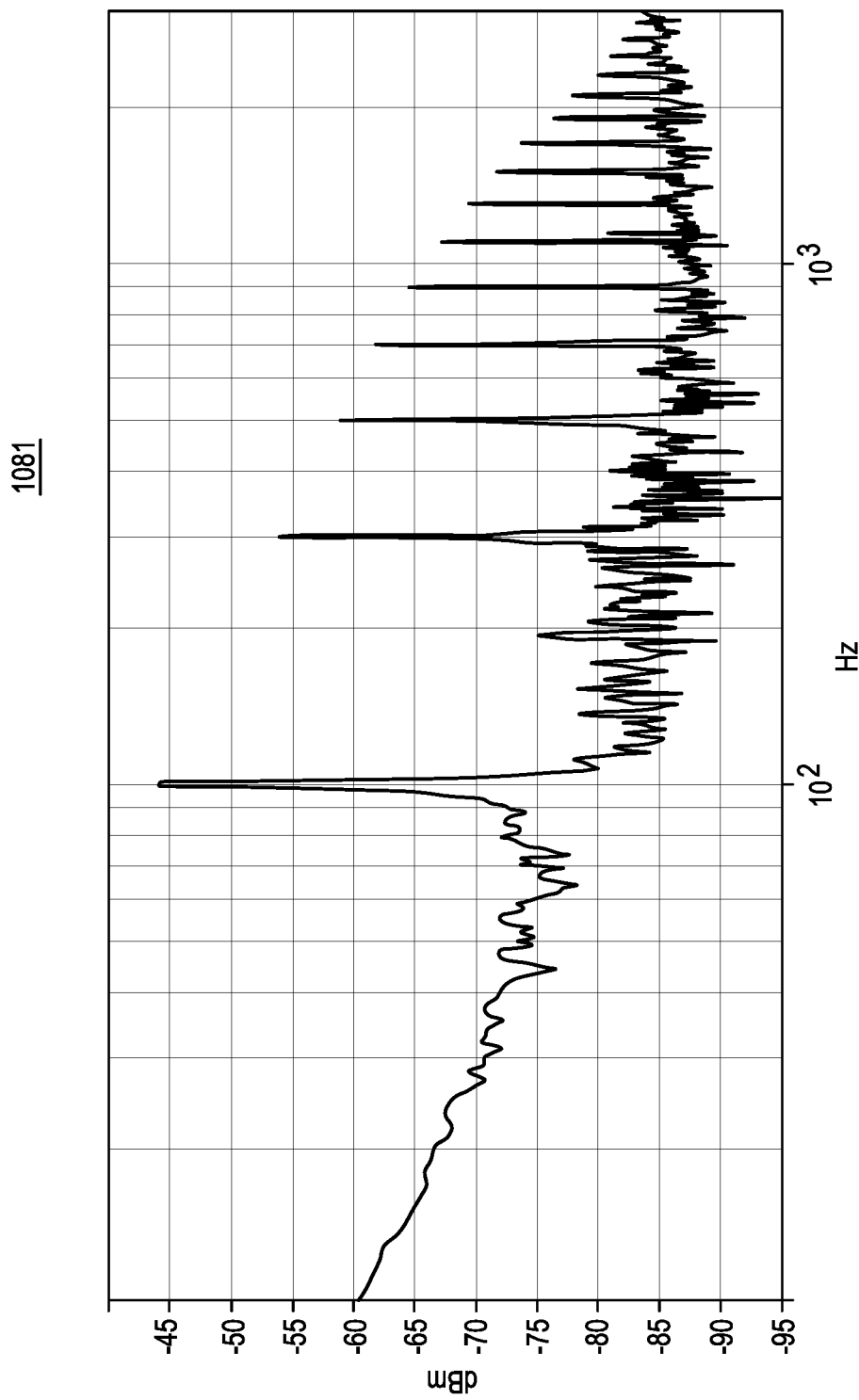
FIG. 10 illustrates a spectrum of spurs in periodic jitter determination for a phase noise measurement, in accordance with a representative embodiment.

FIG. 10 is a graph 1081 that illustrates a spectrum of spurs in periodic jitter determination for a phase noise measurement, in accordance with a representative embodiment.

In FIG. 10, periodic jitter is shown as the spikes. The periodic jitter in FIG. 10 is based on time-data capture by a spectrum analyzer, and spurs producing periodic jitter are identified by the spectrum analyzer applying a program to the IQ data. The periodic jitter in FIG. 10 may be visualized on the display 180 based on the controller 150 executing instructions to implement an algorithm such as the method of FIG. 4A and FIG. 4B combined. The periodic jitter in FIG. 10 is concentrated 100 kHz to 1.5 MHz along the horizontal axis, with a change in the frequency value of the first spike at 100 kHz in FIG. 9, FIG. 10 and FIG. 11.

Figure 11:
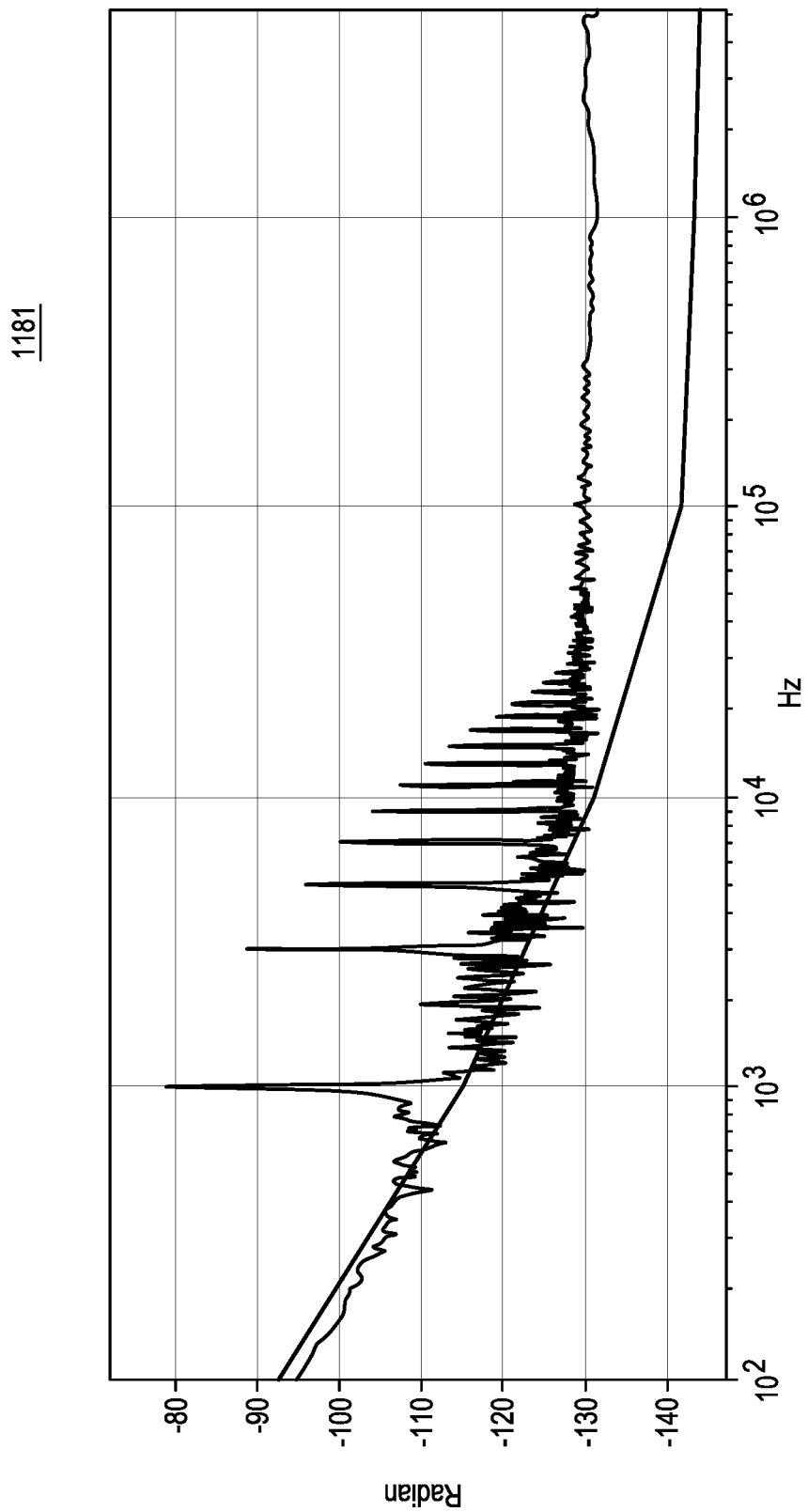
FIG. 11 illustrates a spectrum of spurs in periodic jitter determination for a phase noise measurement, in accordance with a representative embodiment.

FIG. 11 is a graph 1181 that illustrates a spectrum of spurs in periodic jitter determination for a phase noise measurement, in accordance with a representative embodiment.

FIG. 11 illustrates low-frequency phase drift superimposed on the spectrum of spurs in FIG. 10.

Figure 12:
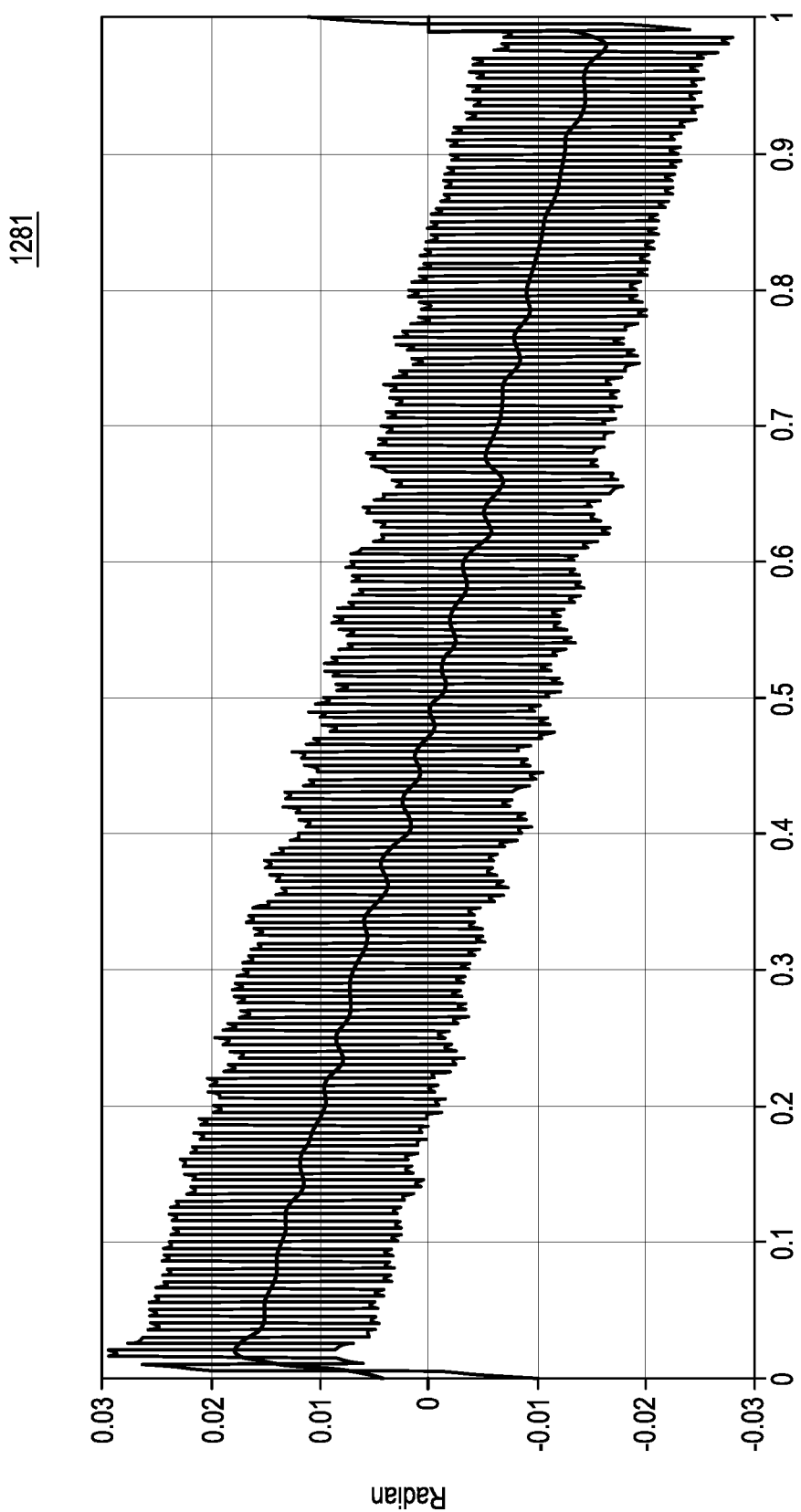
FIG. 12 illustrates demodulated periodic jitter spurs in periodic jitter determination for a phase noise measurement, in accordance with a representative embodiment.

FIG. 12 is a graph 1281 that illustrates demodulated periodic jitter spurs in periodic jitter determination for a phase noise measurement, in accordance with a representative embodiment.

FIG. 12 illustrates the low-frequency phase drift from FIG. 11 superimposed on a demodulated phase due to periodic jitter from FIG. 8. The effect shown in FIG. 12 is developed by a spectrum analyzer, whereas the effect shown in FIG. 6 is developed by an oscilloscope.

Figure 13:
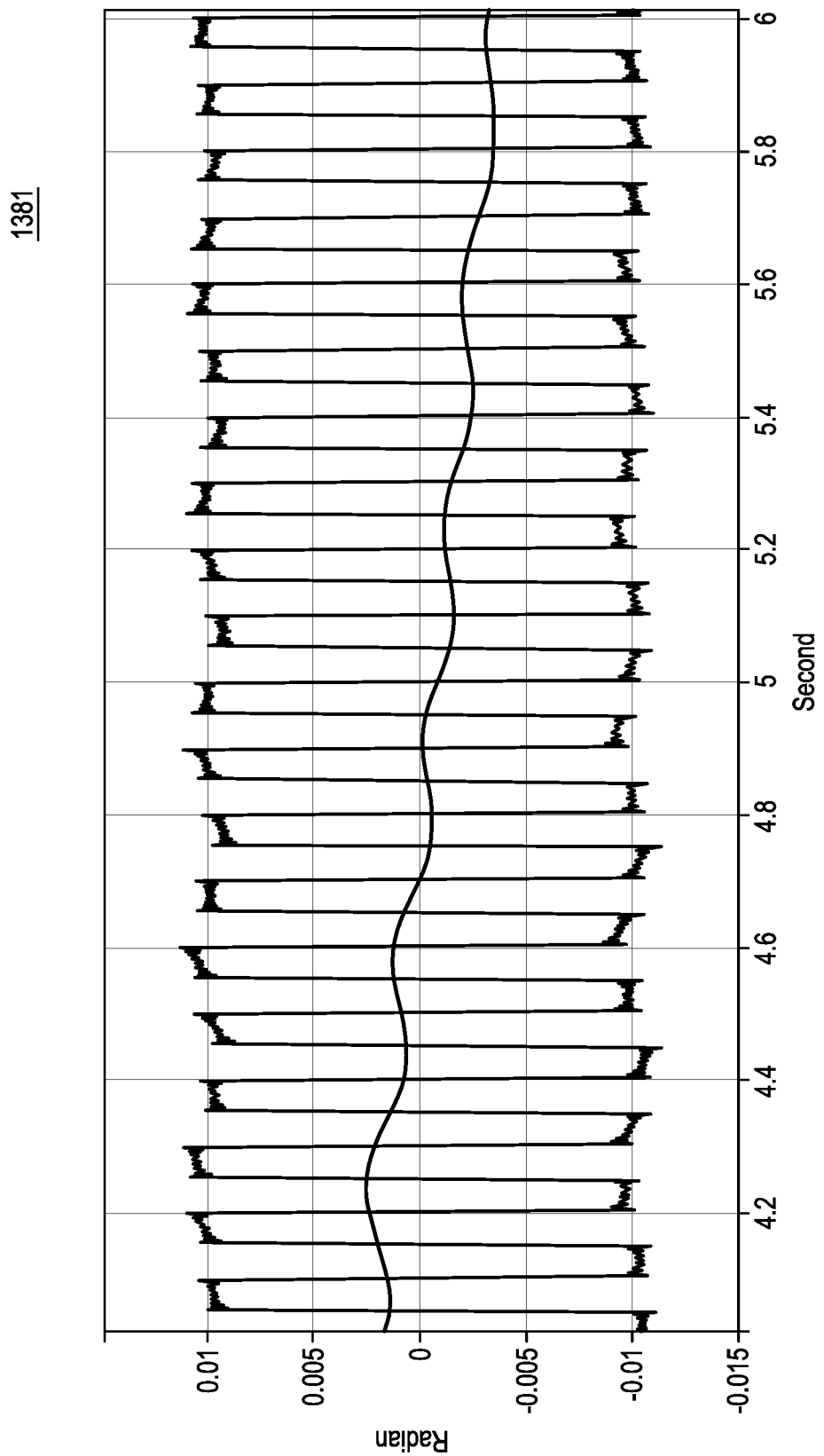
FIG. 13 illustrates demodulated periodic jitter spurs in periodic jitter determination for a phase noise measurement, in accordance with a representative embodiment.

FIG. 13 is a graph 1381 that illustrates demodulated periodic jitter spurs in periodic jitter determination for a phase noise measurement, in accordance with a representative embodiment.

FIG. 13 illustrates the effect of subtracting the low-frequency phase drift tracked in FIG. 11 from the demodulated phase due to periodic jitter in FIG. 12. As shown, the demodulated phase due to periodic jitter is again not exactly uniformly horizontal at the top and bottom of each wave, but is much closer to uniformly horizontal at the top and bottom of each wave compared to the demodulated phased in FIG. 12. The flattening is due to subtraction of the low-frequency phase drift as tracked in FIG. 11. The effect shown in FIG. 13 is developed by a spectrum analyzer, whereas the effect shown in FIG. 7 is developed by an oscilloscope.

As an extension of the teachings above, small levels of periodic jitter may be detected in frequency domain using two-channel cross-correlation by an oscilloscope or spectrum analyzer. Additionally, offset frequencies and amplitudes of periodic jitter spurs may be precisely estimated using either 1-channel Fourier transform of time data, or two-channel cross-correlation (cross-spectrum in frequency domain), using the technique of frequency-domain spur detection. This detects the spurs in dBc unit as compared to normalized dBc/Hz). Phases may be accurately measured using a 1-channel measurement of time data, by directly computing the Fourier transform and then the phase of the Fourier transform tones at the required frequency offsets where the spurs were detected. The phase measurement may be a one-shot measurement with no averaging involved, and is useful when periodic jitter spurs are significantly (10 dB) above the instrument noise floor in the normalized dBc/Hz measurement.

As another extension, spur phase may be averaged for improved accuracy when harmonically related to a fundamental. In this regard, average multiple captures of time-data in either time or frequency domain cannot be directly averaged as they will average to zero. Additionally, the phases of the spurs over multiple captures cannot be directly averaged as they will be different in each capture, and it will lead to a long-term zero average value. However, for spurs that are harmonically related (at integer multiples of a fundamental offset frequency), phase relative to the fundamental may be computed. The Fourier transform data may be de-rotated, and then the mean relative phase of each periodic jitter spur over multiple measurement may be computed before the inverse Fourier transform is taken over the set of periodic jitter spurs in order to determine the peak-peak periodic jitter.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, periodic jitter determination for a phase noise measurement enables detection and correction of frequency errors for received radio frequency signals, such as in the context of testing a device under test. The detection and correction of frequency errors may improve the testing process, and ultimately may result in improved communication devices and communication systems. The frequency error may be corrected such that the resulting waveform shows the peak periodic jitter. The low frequency phase noise may also be removed from the periodic jitter waveform using a moving average filter. Periodic jitter determination for a phase noise measurement may be implemented, for example, by an oscilloscope using features based on FIG. 4A or by a spectrum analyzer using features based on the combination of FIG. 4A and FIG. 4B.

Although periodic jitter determination for a phase noise measurement has been described with reference to several exemplary embodiments, it is understood that the words that have been used are words of description and illustration, rather than words of limitation. Changes may be made within the purview of the appended claims, as presently stated and as amended, without departing from the scope and spirit of periodic jitter determination for a phase noise measurement in its aspects. Although periodic jitter determination for a phase noise measurement has been described with reference to particular means, materials and embodiments, periodic jitter determination for a phase noise measurement is not intended to be limited to the particulars disclosed; rather periodic jitter determination for a phase noise measurement extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

I claim:

1. A signal analysis system, comprising:
   a memory that stores instructions; and
   a processor that executes the instructions, wherein, when executed by the processor, the instructions cause the signal analysis system to:
   digitize a radio frequency signal into a digitized radio frequency signal;
   transform the digitized radio frequency signal into a first transformed digital signal;
   digitally downconvert the digitized radio frequency signal to a first baseband signal;
   filter the first baseband signal into a first filtered signal;
   transform the first filtered signal into a second transformed digital signal;
   compute a first phase noise spectrum from the second transformed digital signal, detect spurs and frequencies corresponding to the spurs in the first phase noise spectrum, and set frequency bins which do not include spurs to zero to generate a modified second transformed digital signal;
   inversely transform the modified second transformed digital signal into a first complex time-domain baseband signal via an inverse Fourier transform;
   demodulate a first phase signal in the first complex time-domain baseband signal to obtain a first demodulated signal; and
   obtain an average of slopes of the first demodulated signal, and obtain an average frequency error from the average of slopes of the first demodulated signal.

2. The signal analysis system of claim 1, wherein, when executed by the processor, the instructions further cause the signal analysis system to:
   apply time-domain windowing to the digitized radio frequency signal before transforming the digitized radio frequency signal into the first transformed digital signal.

3. The signal analysis system of claim 1, wherein, when executed by the processor, the instructions further cause the signal analysis system to:
   suppress amplitude modulation noise in the first complex time-domain baseband signal.

4. The signal analysis system of claim 1, wherein, when executed by the processor, the instructions further cause the signal analysis system to:
   correct the digitized radio frequency signal based on the average frequency error into a corrected radio frequency signal by downconverting the first transformed digital signal using a corrected digital local oscillator into a corrected baseband signal.

5. The signal analysis system of claim 4, wherein, when executed by the processor, the instructions further cause the signal analysis system to:
   filter the corrected baseband signal into a corrected filtered signal.

6. The signal analysis system of claim 5, wherein, when executed by the processor, the instructions further cause the signal analysis system to:
   transform the corrected filtered signal into a third transformed digital signal;
   compute a second phase noise spectrum from the third transformed digital signal, detect spurs and frequencies corresponding to the spurs in the second phase noise spectrum, and set frequency bins which do not include spurs to zero to generate a modified fourth transformed digital signal;
   inversely transform the modified fourth transformed digital signal into a second complex time-domain baseband signal via an inverse Fourier transform;
   demodulate a second phase signal in the second complex time-domain baseband signal to obtain a second demodulated signal; and
   obtain an average of slopes of the second demodulated signal, and obtain an average frequency error from the average of slopes of the second demodulated signal.

7. The signal analysis system of claim 6, wherein, when executed by the processor, the instructions further cause the signal analysis system to:
   measure peak periodic phase jitter by measuring a peak of time domain combined phase of all spurs selected in a frequency domain for the corrected baseband signal, and after removing the average frequency error from the average of slopes of the second demodulated signal.

8. The signal analysis system of claim 1, wherein the inverse Fourier transform is applied to spur tone frequency data remaining in the modified second transformed digital signal.

9. The signal analysis system of claim 1, wherein, when executed by the processor, the instructions further cause the signal analysis system to:
   filter the modified second transformed digital signal using a moving average filter;
   average phases from the modified second transformed digital signal after filtering to obtain an averaged phase; and
   produce a waveform of the second transformed digital signal attributable to periodic constituent spurs by subtracting the averaged phase from the modified second transformed digital signal.

10. The signal analysis system of claim 1, wherein the signal analysis system comprises one of an oscilloscope and a spectrum analyzer.

11. The signal analysis system of claim 1, wherein, when executed by the processor, the instructions further cause the signal analysis system to:
    digitally downconvert the digitized radio frequency signal to an intermediate digital signal at an intermediate frequency;
    transform the intermediate digital signal into a first transformed intermediate digital signal;
    identify a peak value in the first transformed intermediate digital signal to determine a carrier frequency in the first transformed intermediate digital signal;

digitally downconvert the digitized radio frequency signal to a complex baseband signal based on the carrier frequency in the first transformed intermediate digital signal;

filter the complex baseband signal to remove high frequency components; and then transform the filtered complex baseband signal into a second transformed intermediate digital signal.

12. A method for signal analysis, the method comprising:

digitizing, by a processor that executes instructions from a memory, a radio frequency signal into the digitized radio frequency signal;

transforming, by the processor that executes instructions from the memory, the digitized radio frequency signal into a first transformed digital signal;

digitally downconverting the digitized radio frequency signal to a first baseband signal;

filtering the first baseband signal into a first filtered signal;

transforming the first filtered signal into a second transformed digital signal;

computing a first phase noise spectrum from the second transformed digital signal, detecting spurs and frequencies corresponding to the spurs in the first phase noise spectrum, and setting frequency bins which do not include spurs to zero to generate a modified second transformed digital signal;

inversely transforming the modified second transformed digital signal into a first complex time-domain baseband signal via an inverse Fourier transform;

demodulating a first phase signal in the first complex time-domain baseband signal to obtain a first demodulated signal; and obtaining an average of slopes of the first demodulated signal, and obtain an average frequency error from the average of slopes of the first demodulated signal.

13. The method of claim 12, further comprising:

correcting the digitized radio frequency signal based on the average frequency error into a corrected radio frequency signal by downconverting the first transformed digital signal using a corrected digital local oscillator into a corrected baseband signal; and filtering the corrected baseband signal into a corrected filtered signal.

14. A controller for signal analysis, the controller comprising:

a memory that stores instructions; and a processor that executes the instructions, wherein, when executed by the processor, the instructions cause a signal analysis system to:

digitize a radio frequency signal into the digitized radio frequency signal;

transform the digitized radio frequency signal into a first transformed digital signal;

digitally downconvert the digitized radio frequency signal to a first baseband signal;

filter the first baseband signal into a first filtered signal;

transform the first filtered signal into a second transformed digital signal;

compute a first phase noise spectrum from the second transformed digital signal, detect spurs and frequencies corresponding to the spurs in the first phase noise spectrum, and set frequency bins which do not include spurs to zero to generate a modified second transformed digital signal;

inversely transform the modified second transformed digital signal into a first complex time-domain baseband signal via an inverse Fourier transform;

demodulate a first phase signal in the first complex time-domain baseband signal to obtain a first demodulated signal; and obtain an average of slopes of the first demodulated signal, and obtain an average frequency error from the average of slopes of the first demodulated signal.

15. The controller of claim 14, wherein, when executed by the processor, the instructions further cause the signal analysis system to:

apply time-domain windowing to the digitized radio frequency signal before transforming the digitized radio frequency signal into the first transformed digital signal.

16. The controller of claim 14, wherein, when executed by the processor, the instructions further cause the signal analysis system to:

suppress amplitude modulation noise in the first complex time-domain baseband signal.

17. The controller of claim 14, wherein the inverse Fourier transform is applied to spur tone frequency data remaining in the modified second transformed digital signal.

18. The controller of claim 14, wherein, when executed by the processor, the instructions further cause the signal analysis system to:

filter the modified second transformed digital signal using a moving average filter;

average phases from the modified second transformed digital signal after filtering to obtain an averaged phase; and produce a waveform of the second transformed digital signal attributable to periodic constituent spurs by subtracting the averaged phase from the modified second transformed digital signal.

19. The controller of claim 14, wherein the signal analysis system comprises one of an oscilloscope and a spectrum analyzer.

20. The controller of claim 14, wherein, when executed by the processor, the instructions further cause the signal analysis system to:

digitally downconvert the digitized radio frequency signal to an intermediate digital signal at an intermediate frequency;

transform the intermediate digital signal into a first transformed intermediate digital signal;

identify a peak value in the first transformed intermediate digital signal to determine a carrier frequency in the first transformed intermediate digital signal;

digitally downconvert the digitized radio frequency signal to a complex baseband signal based on the carrier frequency in the first transformed intermediate digital signal;

filter the complex baseband signal to remove high frequency components; and then transform the filtered complex baseband signal into a second transformed intermediate digital signal.

* * * * *